US008818534B2

(12) United States Patent
Wang et al.

(10) Patent No.: US 8,818,534 B2
(45) Date of Patent: Aug. 26, 2014

(54) ELECTRONIC APPARATUS WITH AUTOMATIC ORIENTATION FUNCTION

(75) Inventors: Ting-Kai Wang, Taipei Hsien (TW); Bin Li, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 905 days.

(21) Appl. No.: 12/915,066

(22) Filed: Oct. 29, 2010

(65) Prior Publication Data

US 2011/0238219 A1 Sep. 29, 2011

(30) Foreign Application Priority Data

Mar. 26, 2010 (CN) .......................... 2010 1 0133309

(51) Int. Cl.
*G05B 19/18* (2006.01)
*G09G 3/34* (2006.01)

(52) U.S. Cl.
USPC ............... 700/57; 700/65; 700/275; 700/302; 345/110; 248/125.9

(58) Field of Classification Search
None
See application file for complete search history.

(56) References Cited

U.S. PATENT DOCUMENTS

| | | | | |
|---|---|---|---|---|
| 6,311,141 | B1 * | 10/2001 | Hazra | 702/150 |
| 6,826,284 | B1 * | 11/2004 | Benesty et al. | 381/92 |
| 2006/0239121 | A1 | 10/2006 | Kong et al. | |
| 2006/0294553 | A1 * | 12/2006 | Walter et al. | 725/81 |
| 2007/0252919 | A1 * | 11/2007 | McGreevy | 348/825 |
| 2009/0086097 | A1 | 4/2009 | Onomatsu | |
| 2009/0201165 | A1 * | 8/2009 | Hwang et al. | 340/686.1 |

FOREIGN PATENT DOCUMENTS

| | | |
|---|---|---|
| CN | 2722540 | 8/2005 |
| CN | 1854760 | 11/2006 |
| CN | 101321256 | 12/2008 |

* cited by examiner

*Primary Examiner* — Sean Shechtman
(74) *Attorney, Agent, or Firm* — Novak Druce Connolly Bove + Quigg LLP

(57) ABSTRACT

An electronic apparatus includes a first member, a second member with a first point and a second point, a processing unit, and a drive device. The drive device pivotably connects the second member to the first member. The processing unit calculates a first distance between the first point and a third point and a second distance between the second point and the third point. The processing unit controls the drive device to rotate the second member relative to the first member according to the first distance and the second distance, thus the line defined by the third point and a middle point between the first point and the second point is perpendicular to the line defined by the first point and the second point.

13 Claims, 5 Drawing Sheets

ELECTRONIC APPARATUS WITH AUTOMATIC ORIENTATION FUNCTION

BACKGROUND

1. Technical Field

The disclosed embodiments relate to electronic apparatuses, and more particularly to an electronic apparatus with a first member and a second member capable of rotating with respect to the first member for an automatic adjustment of orientation of the electronic device with respect to a user.

2. Description of Related Art

Generally, a table top electronic apparatus, such as a television, includes a table stand and a display pivotably connected together. However, although the display is rotatable relative to the table stand, adjustments must be made manually, which is inconvenient for users.

Therefore, there is room for improvement in the art.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the present embodiments. Moreover, in the drawings, like reference numerals designate corresponding parts throughout five views.

DETAILED DESCRIPTION

Figure 1:
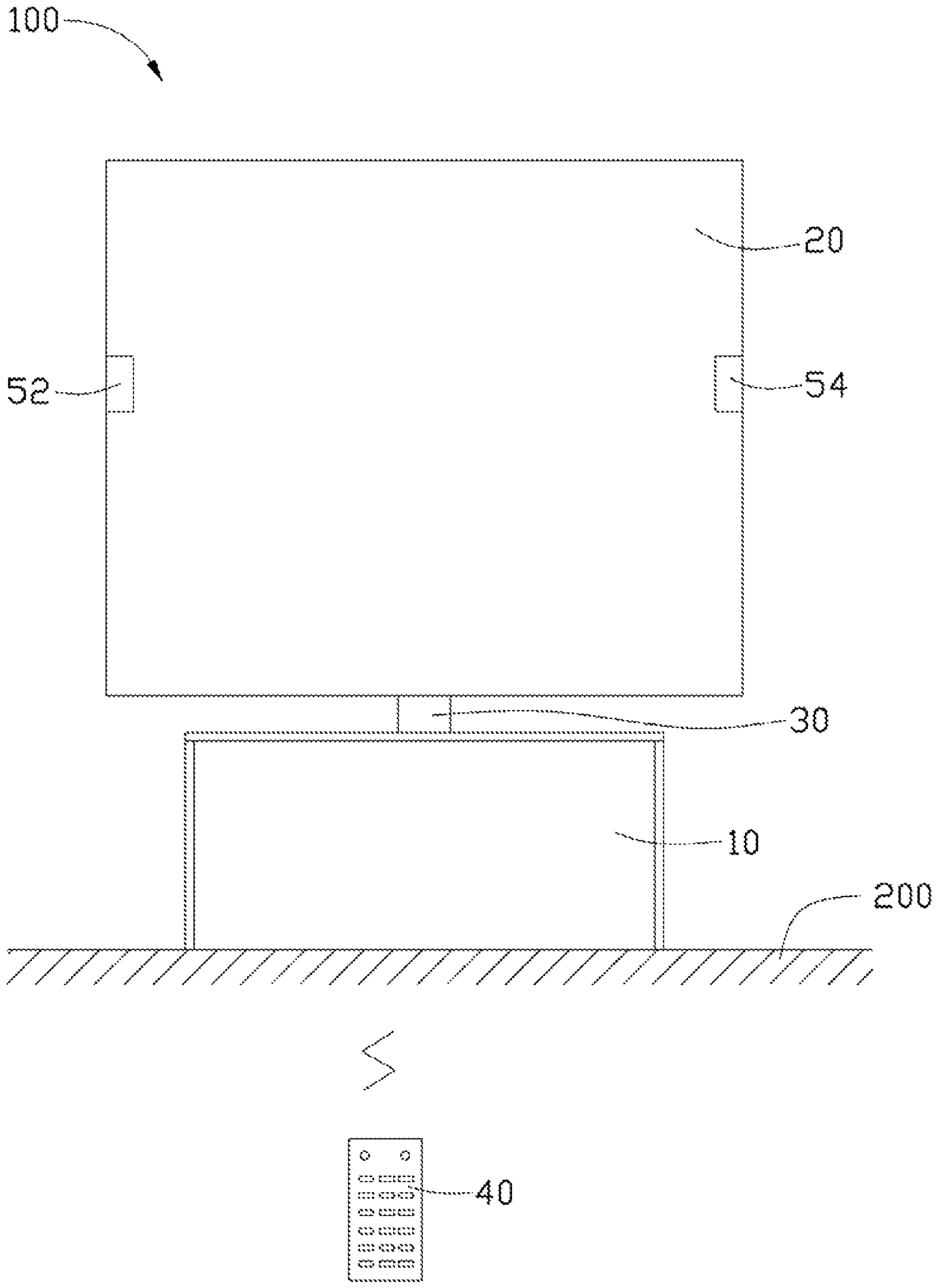
FIG. 1 is a schematic diagram showing an electronic apparatus and an input device in accordance with an exemplary embodiment, the electronic apparatus includes a first member and a second member.
Figure 2:
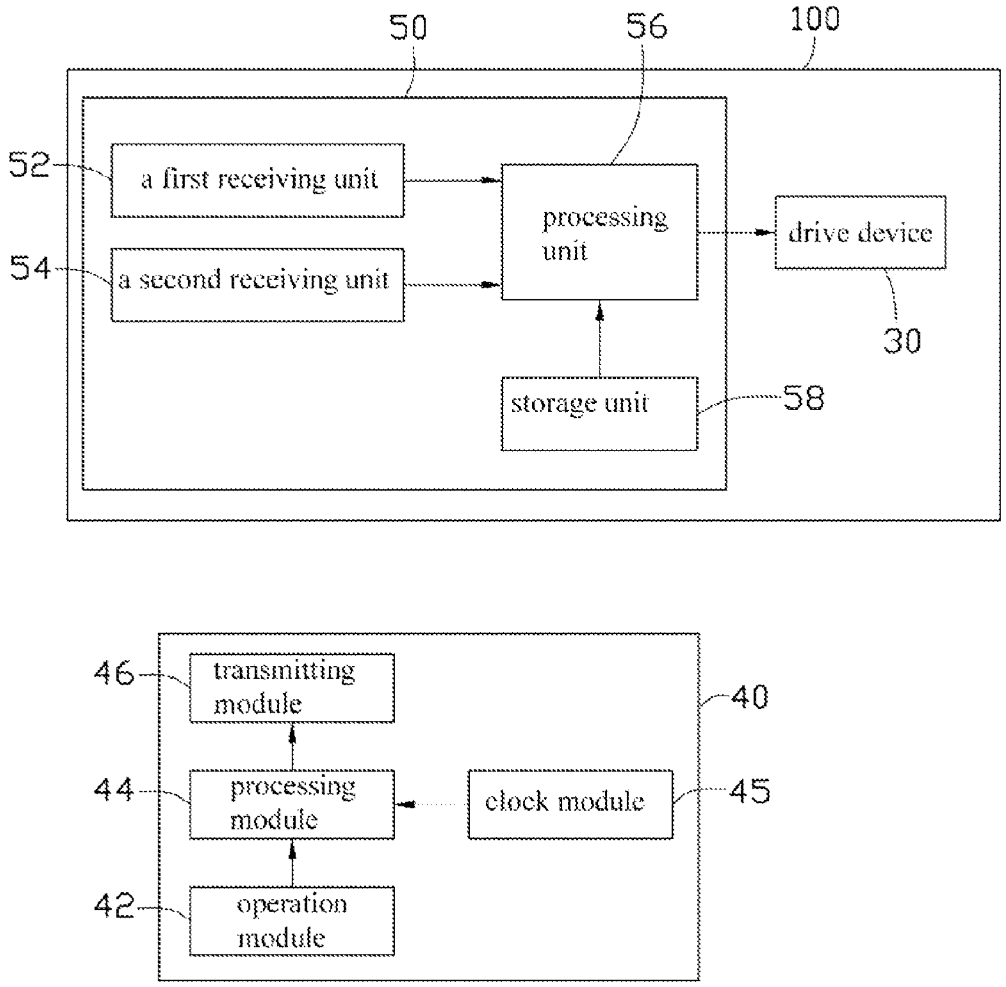
FIG. 2 is block diagram of the electronic apparatus and the input device of FIG. 1.

Referring to FIGS. 1 and 2, an electronic apparatus 100 supported by a supporting surface 200 includes a first member 10, a second member 20, a drive device 30, and a control device 50. The first member 10 is placed on the supporting surface 200 and supports the second member 20. The drive device 30 pivotably connects the second member 20 to the first member 10. In this embodiment, the electronic apparatus 100 is a television, the first member is a table stand, and the second member 20 is a rectangular display.

The control device 50 is disposed in the first member 10 or the second member 20. The control device 50 is used for receiving a control signal from an input device 40 and controlling the drive device 30 to rotate the second member 20 relative to the first member 10 according to the control signal. In this embodiment, the input device 40 is a remote control of the electronic apparatus 100.

In detail, the input device 40 includes an operation module 42, a processing module 44, a clock module 45, and a transmitting module 46. The operation module 42 is used for generating a command in response to an operation of a user. The processing module 44 extracts transmitting time information from the clock module 45, and then controls the transmitting module 46 to transmit the control signal including the transmitting time information according to the command The control signal is wirelessly transmitted to the control device 50.

The control device 50 includes a first receiving unit 52, a second receiving unit 54, a processing unit 56, and a storage unit 58. The first receiving unit 52 and the second receiving unit 54 are disposed on the second member 20. In the embodiment, the first receiving unit 52 and the second receiving unit 54 are disposed on opposite sides of the second member 20. The line defined by the first receiving unit 52 and the second receiving unit 54 is parallel to the supporting surface 200.

The first receiving unit 52 is used for receiving the control signal from the input device 40. The processing unit 56 obtains the transmitting time information from the control signal and first receiving time information of the control signal being received by the first receiving unit 52, calculates a first time difference between the transmitting time and the first receiving time, and calculates a first distance between the input device 40 and the first receiving unit 52 according to the first time difference.

The second receiving unit 54 is also used for receiving the control signal from the input device 40. The processing unit 56 obtains the transmitting time information from the control signal and second receiving time information of the control signal being received by the second receiving unit 54, calculates a second time difference between the transmitting time and the second receiving time, and calculates a second distance between the input device 40 and the second receiving unit 54 according to the second time difference.

The storage unit 58 includes a pre-stored third distance between the first receiving unit 52 and the second receiving unit 54. The processing unit 56 generates a drive signal according to the first distance, the second distance, and the third distance. The drive device 30 rotates the second member 20 through a first angle relative to the first member 10 according to the drive signal, thus the second member 20 faces the input device 40. If the first distance is longer than the second distance, the drive device 30 rotates the second member 20 through the first angle relative to the first member 10 in a first direction. If the first distance is smaller than the second distance, the drive device 30 rotates the second member 20 through the first angle relative to the first member 10 in a second direction. If the first distance is equal to the second distance, the drive device 30 does not rotate the second member 20 relative to the first member 10, thus the second member 20 is maintained in orientation facing the input device 40, which means the display panel disposed in the second member 20 faces a user operating the input device 40. Thus the user can view the display panel without having to manually adjust orientation of the display panel. In this embodiment, the first direction is anticlockwise, the second direction is clockwise.

Figure 3:
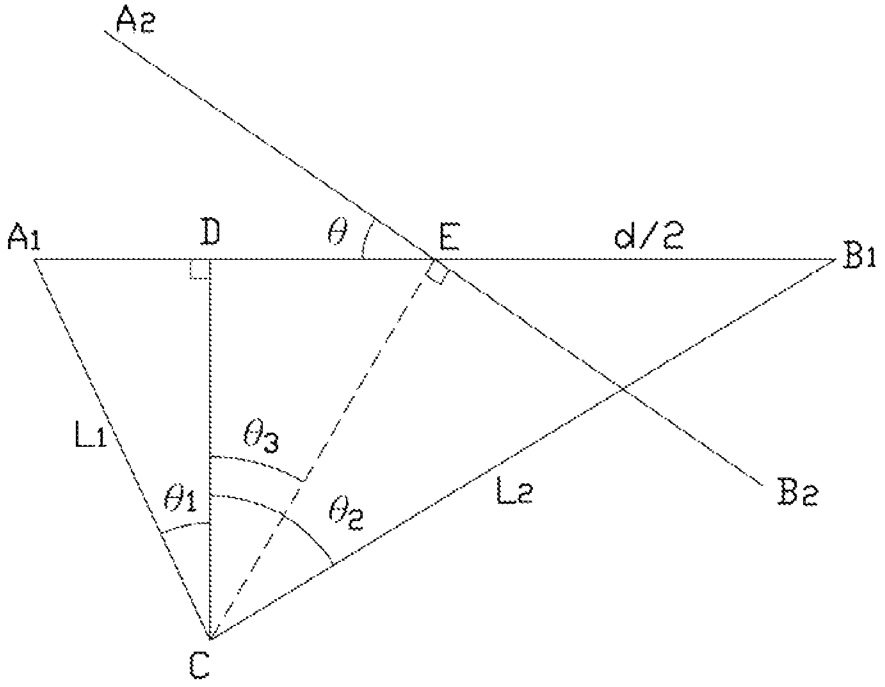
FIG. 3 is an illustration of calculating a first angle of rotation by the first member relative to the second member of FIG. 1.

Referring also to FIG. 3, when the second member 20 is in a first position, that is, an imaginary line from the input device 40 to the center of the second member 20 is not perpendicular to the plane of the second member 20. It is assumed that the first receiving unit 52 is located at the point A1, the second receiving unit 54 is located at point B1, and the input device 40 is located at point C; the first distance is L1, the second distance is L2, the third distance is d. That is, the distance between point A1 and point C is L1, the distance between point B1 and point C is L2, and the distance between point A1 and point B1 is d. A first side A1C, a second side B1C and a third side A1B1 forms a triangle. A line CD is perpendicular to the third side A1B1. The first side A1C forms an angle $\theta 1$ relative to the line CD, the second side B1C forms an angle $\theta 2$ relative to the line CD. Because L1, L2, and d are known as described above, the angle θ1 and θ2 are calculated using the following formulas:

$$L1\times \text{Sin}\ \theta_1 + L2\times \text{Sin}\ \theta_2 = d \quad (1)$$

$$L1\times \text{Cos}\ \theta_1 = L2\times \text{Cos}\ \theta_2 \quad (2)$$

At this time, if the drive device 30 rotates the second member 20 through the first angle θ relative to the first member 10, the second member 20 will be in a second position facing the input device 40. When the second member 20 is located at the second position, the first receiving unit 52 is located at the point A2, the second receiving unit 54 is located at point B2. A line CE is perpendicular to a line A2B2, a line CD is perpendicular to a line A1B1. The two lines A1B1 and A2B2 define the first angle θ, the two lines CD and CE define an angle $\theta_3$ which is equal to the first angle θ. The first angle θ is calculated by the following formula:

$$tg\theta = \frac{\frac{d}{2} - L1\times \text{Sin}\theta_1}{L1\times \text{Cos}\theta_1} \quad (3)$$

Figure 4:
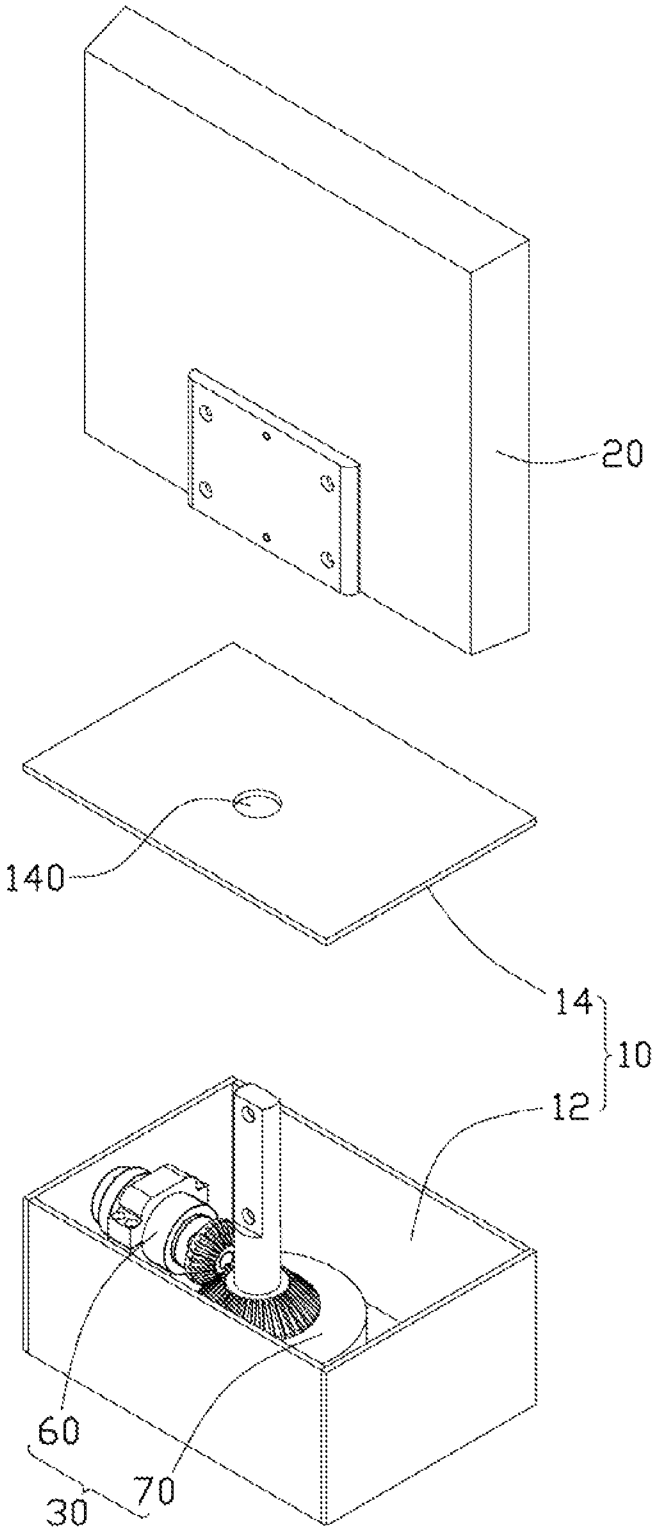
FIG. 4 is a partially exploded view showing the electronic apparatus of FIG. 1.

Referring to FIG. 4, the first member 10 is rectangular, and includes a base 12 and a first plate 14. A center of the first plate 14 defines a first hole 140, the base 12 is hollow, and the first plate 14 is fastened to the base 12. The drive device 30 includes a drive module 60 and a rotating mechanism 70. The drive module 60 is disposed within the base 12. One end of the rotating mechanism 70 is fixed to the first member 10, and the other end of the rotating mechanism 70 is fixed to the second member 20. The drive module 60 receives the drive signal from the processing unit 56 and rotates the rotating mechanism 70 according to the drive signal, so that the second member 20 rotates relative to the first member 10.

Figure 5:
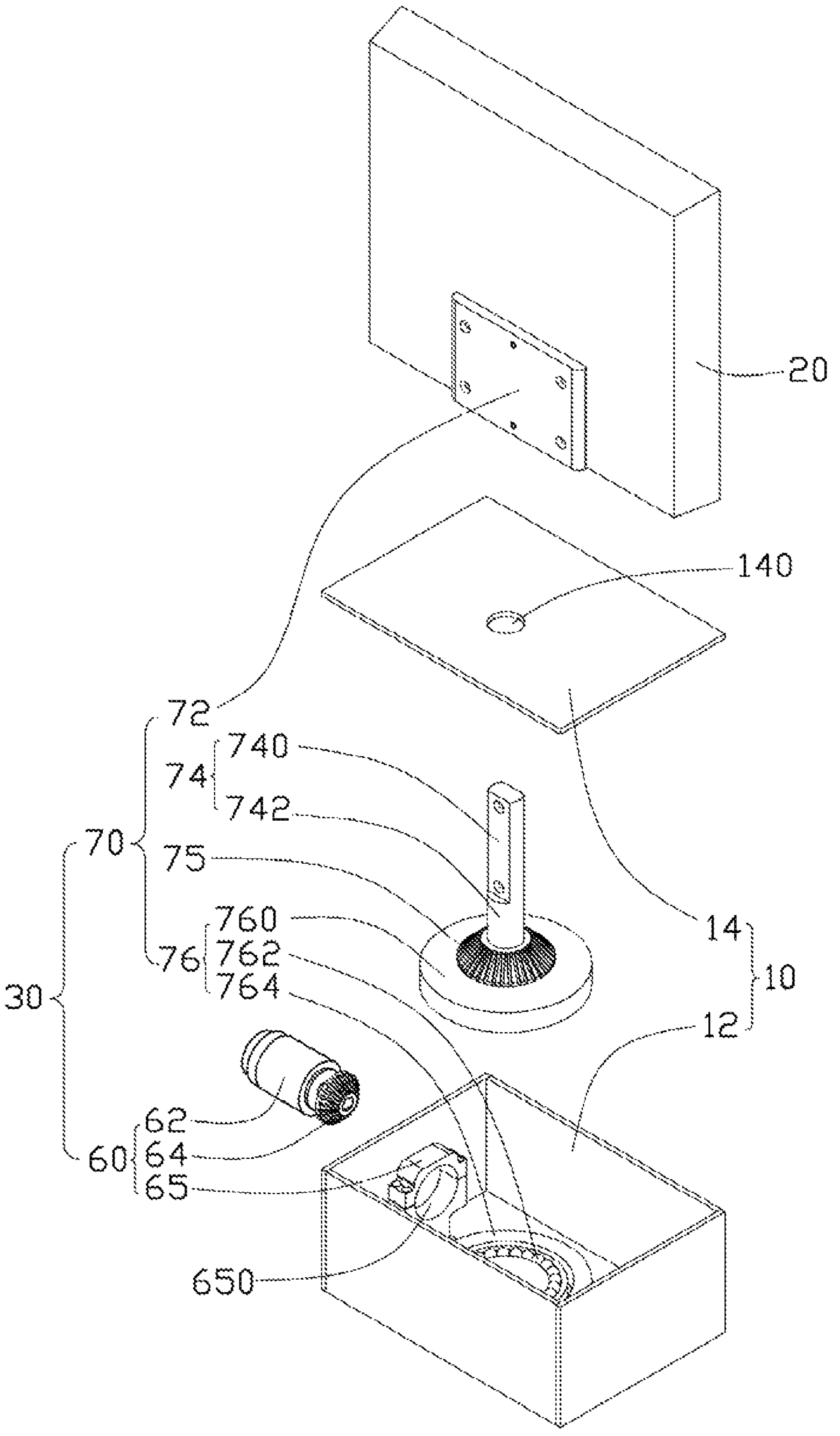
FIG. 5 is a further exploded view showing the electronic apparatus of FIG. 4.

Referring to FIG. 5, the drive module 60 includes a motor 62, a first gear 64, and a fixing part 65. The fixing part 65 is fastened in the first member 10, and defines a second hole 650. The motor 62 is fixed in the second hole 650, and is used for driving the first gear 64 to rotate.

The rotating mechanism 70 includes a second plate 72, a connecting part 74, a second gear 75, and a rotating part 76. The second plate 72 is rectangular and is fixed to the second member 20. One end of the connecting part 74 is fixed to the second plate 72. The second gear 75 is fixed between the other end of the connecting part 74 and the rotating part 76. The second gear 75 engages with the first gear 64, and rotates when the first gear 64 rotates. The rotating part 76 is rotatably fixed in the first member 10.

The rotating part 76 includes a rotating module 760, a number of bearings 762 and a supporting module 764. The bearings 762 are disposed between the rotating module 760 and the supporting module 764. The supporting module 764 is fixed within the first member 10 and used for supporting the rotating module 760. The rotating module 760 is fixed to the second gear 75, the rotating module 760 rotates relative to the supporting module 764 on the bearings 762.

The connecting part 74 includes a first rod 740 and a second rod 742. One end of the first rod 740 passes through the first hole 140, then is fixed to the second plate. The second rod 742 is connected to the other end of the first rod 740 and the second gear 75. The first plate 14 receives the first rod 740 through the first hole 140, and securely fastens the base 12. A diameter of the second rod 742 is longer than that of the first hole 140, so that the rotating part 76 is fixed within the first member 10.

In use, when users operates the input device 40, the control signal is generated, and the drive device 30 rotates the second member 20 relative to the first member 10 in response to the control signal, thus it is convenient for the users. In some embodiments, the control signal may be generated when a dedicated key of the remote control is pressed by a user. In other embodiments, the control signal may be generated as set by users, such as anytime any button of the remote control is pressed.

Further alternative embodiments will become apparent to those skilled in the art without departing from the spirit and scope of what is claimed. Accordingly, the present invention should be deemed not to be limited to the above detailed description, but rather only by the claims that follow and equivalents thereof.

What is claimed is:

1. An electronic apparatus comprising:
a first member;
a second member;
a drive device pivotably connecting the first member to the second member;
a first receiving unit for receiving a control signal generated by an input device;
a second receiving unit for receiving the control signal from the input device; and
a processing unit for computing a first distance between the first receiving unit and the input device, and a second distance between the second receiving unit and the input device in response to the control signal generated by the input device;
wherein the processing unit controls the drive device to rotate the second member relative to the first member according to a comparison result between the first distance and the second distance.

2. The electronic apparatus as claimed in claim 1, wherein the first receiving unit and the second receiving unit are disposed on two opposite sides of the second member, the first member is placed on a supporting surface and supports the second member, the line defined by the first receiving unit and the second receiving unit is parallel to the supporting surface.

3. The electronic apparatus as claimed in claim 1, wherein when the first distance is longer than the second distance, the drive device rotates the second member relative to the first member in a first direction; when the first distance is smaller than the second distance, the drive device rotates the second member relative to the first member in a second direction different from the first direction.

4. The electronic apparatus as claimed in claim 3, wherein the first direction is anticlockwise, the second direction is clockwise.

5. The electronic apparatus as claimed in claim 1, wherein the drive device rotates the second member through a first angle relative to the first member, thus the first distance is equal to the second distance, the electronic apparatus further comprises a storage unit which includes a pre-stored third distance between the first receiving unit and the second receiving unit, the processing unit calculates the first angle according to the first distance, the second distance and the third distance.

6. The electronic apparatus as claimed in claim 1, wherein the control signal comprises a transmitting time information, the processing unit obtains the transmitting time information from the control signal and first receiving time information of the control signal being received by the first receiving unit, calculates a first time difference between the transmitting time and the first receiving time, and calculates the first distance according to the first time difference.

7. The electronic apparatus as claimed in claim 6, wherein the processing unit obtains second receiving time information of the control signal being received by the second receiving unit, calculates a second time difference between the transmitting time and the second receiving time, and calculates the second distance according to the second time difference.

8. The electronic apparatus as claimed in claim 1, wherein the drive device comprises a drive module and a rotating mechanism, the drive module is disposed within the first member, one end of the rotating mechanism is fixed to the first member, the other end of the rotating mechanism is fixed to the second member, the drive module rotates the rotating mechanism.

9. The electronic apparatus as claimed in claim 8, wherein the drive module comprises a motor and a first gear, the motor is fixed within the first member and rotates the first gear, the rotating mechanism comprises a connecting part and a second gear disposed within the first member, the connecting part is fixed between the second member and the second gear, the first gear engages with the second gear and rotates the second gear.

10. The electronic apparatus as claimed in claim 9, wherein the first member comprises a first plate and a base, the first plate defines a first hole, the connecting part comprises a first rod and a second rod, the first rod is fixed to the second member, the second rod is fixed between the first rod and the second gear, the first plate receives the first rod through the first hole and fastens the base, the diameter of the second rod is longer than that of the first hole.

11. The electronic apparatus as claimed in claim 9, wherein the rotating mechanism further comprises a rotating part, the rotating part comprises a rotating module, a number of bearings, and a supporting module fixed within the first member, the bearings are disposed between the rotating module and the supporting module, the rotating module is fixed to the second gear, the rotating module rotates relative to the supporting module on the bearings.

12. An electronic apparatus comprising:
- a stand;
- a display;
- a drive device pivotably connecting the stand to the display;
- a first receiving unit disposed on the display and configured for receiving a control signal generated by a remote control;
- a second receiving unit disposed on the display and configured for receiving the control signal from the remote control; and
- a processing unit for computing a first distance between the first receiving unit and the remote control and a second distance between the second receiving unit and the remote control in response to the control signal generated by the input device;
- wherein the processing unit controls the drive device to rotate the display relative to the stand according to a comparison result between the first distance and the second distance.

13. The electronic apparatus as claimed in claim 12, wherein the control signal comprises a transmitting time information, the processing unit obtains the transmitting time information from the control signal and first receiving time information of the control signal being received by the first receiving unit, calculates a first time difference between the transmitting time and the first receiving time, and calculates the first distance according to the first time difference, and the processing unit obtains second receiving time information of the control signal being received by the second receiving unit, calculates a second time difference between the transmitting time and the second receiving time, and calculates the second distance according to the second time difference.

* * * * *